United States Patent Office 3,423,341
Patented Jan. 21, 1969

3,423,341
PROCESS FOR MAKING OIL MODIFIED ALKYD RESINS WHEREIN ALL REACTANTS ARE ADDED IN ONE CHANGE
Robert J. Klare and Grant O. Sedgwick, Minneapolis, Minn., assignors to Ashland Oil & Refining Company, Ashland, Ky., a corporation of Kentucky
No Drawing. Filed Dec. 11, 1964, Ser. No. 417,795
U.S. Cl. 260—22          13 Claims
Int. Cl. C08g 17/16

ABSTRACT OF THE DISCLOSURE

Oil-modified alkyd resins are prepared by forming a mixture of alkyd resin forming ingredients in a reaction zone, said mixture having a remaining ratio of at least about 1.07 at a selected alcoholysis temperature and a selected superatmospheric steam pressure; reacting said mixture at said selected alcoholysis temperature and said superatmospheric steam pressure to thereby produce an alcoholysis product, releasing said steam pressure and esterifying said alcoholysis product thereby producing an oil-modified alkyd resin.

---

The present invention relates to an in situ alcoholysis process. In a second aspect, the present invention relates to a process for making oil-modified alkyd resins wherein alcoholysis and esterification are conducted sequentially in a single reaction zone and wherein all reactants are added in one charge.

The alkyd resins comprise one of the most versatile groups of synthetic resins known. They can be readily adapted to the production of a wide variety of coatings. Consequently, in recent years they have been used in the paint field in a greater volume than any other single class of resins. One of their most outstanding qualities is their ability to impart distinctive properties of beauty and flexibility to both varnishes and enamels. These properties are retained to a considerable extent even on prolonged exposure of the varnish or enamel to weathering. Individual resins of the group (i.e., alkyd resins), while possessing these primary characteristics, naturally are designed to differ widely from one another.

The primary reaction involved in the preparation of all alkyd resins is esterification. Thermoplastic, nonheat convertible resins are obtained when both the alcohol and acid reactants (the primary reactants are carboxylic acids and alcohols) possess two and only two reactive groups in their molecular structures (i.e., a dicarboxylic acid and a dihydric alcohol). Such a reaction is bifunctional and produces chain molecules of relatively large molecular weights. The ends of the chains can terminate in either a free carboxyl or free hydroxyl group. To obtain a neutral resin, these free groups can be further esterified with a monohydric alcohol or a monocarboxylic acid. These linear polyesters are usually produced by the direct esterification of a saturated dihydric alcohol (e.g., glycol) with a dicarboxylic acid (e.g., succinic acid or phthalic anhydride). Resins are obtained only if the alcohol and acid contain the proper structure to yield chains of certain spacial complexity. Otherwise, crystalline or fiber products are produced. For example, the product formed as a result of the fairly complete esterification of phthalic acid with ethylene glycol at room temperature is a hard, brittle resin. Propylene glycol behaves similarly, also yielding a glassy product. By way of contrast, however, diethylene glycol forms a soft resin that is soluble in both methanol and water.

Thermosetting, heat convertible resins result when one or more of the reactants (i.e., the alcohol or the acid) contain more than two reactive groups (i.e., more than two hydroxyl groups in the alcohol and/or more than two carboxyl groups in the acid). Such polyfunctional reactions are capable of forming three dimensional molecules. These resins are characterized by their ability to form insoluble, infusible gels under the influence of heat. A typical example of this type of reaction is that between phthalic anhydride and glycerol. In this reaction, gelation takes place so sharply that the reaction must be stopped short of the gel point. As a consequence, unmodified glycerol phthalate has known only limited commercial use.

Between these two extremes, it is possible to produce alkyd resins having properties that can be tailormade for almost any particular application by reacting various combinations of monohydric alcohols, dihydric alcohols and polyhydric alcohols with various combinations of monobasic acids, dibasic acids and polybasic acids. Because of the extensive permutations and combinations that are possible, a wide variety of alkyd resins are currently being produced from an even wider variety of ingredients. However, it is not meant to imply that resins can always be made with ease in meeting some new demand. Often, the exercise of a considerable amount of inventive skill is involved.

Because of the considerable expense involved in the preparation of carboxylic acids and alcohols in pure form, those skilled in the art have long sought cheaper ways of preparing alkyd resins. These prohibitively high costs dropped considerably after the development, some years ago, of the alcoholysis principle which enabled manufacturers to use oils of fatty acids (i.e., glycerides) rather than pure fatty acids and glycerine themselves. At the present time, all of the well known drying oils and their corresponding fatty acids are used to modify the properties of alkyd resins.

According to techniques that are currently used in the manufacture of oil-modified alkyl resins, a polyhydric alcohol (e.g., pentaerythritol) is first reacted under alcoholysis conditions (e.g., at atmospheric pressure and 450° F. using a catalyst) with a glycerol ester of fatty acid (e.g., soybean oil). During the alcoholysis reaction, the polyhydric alcohol reacts metathetically with the fatty acid portion of the glycerol ester. Subsequently, and often in a separate vessel, the other alkyl resin ingredients (e.g., phthalic anhydride) are added to the alcoholysis product. This mixture is then esterified to form the desired alkyl resin. The purpose of the alcoholysis step is to obtain a fatty acid-containing molecule having at least one reactive (i.e., free) hydroxyl group. The free hydroxyl groups on these molecules can then react with polybasic acid and thereby become part of the resin network. If the alcoholysis step were eliminated (i.e., by putting all of the resin forming ingredients together), the reaction kinetics are such that the polybasic acid would, under these conditions, react preferentially with the polyol, leaving the oil as a separate constituent (often as a separate phase). The net result would be a useless combination of oil and oil-free polyester which would probably be gelled.

It has now been discovered, and this discovery forms a basis for the present invention, that oil-modified alkyd resins can be prepared (e.g., from glycerol esters such as linseed oil) by an in situ alcoholysis process wherein all of the ingredients are brought together at one time. In order for the in situ alcoholysis process to be effective, certain conditions must be met and certain parameters must be kept in mind.

Briefly described, the in situ alcoholysis process of the present invention involves charging all of the essential alkyl resin forming ingredients to a reaction vessel. The formulation employed is controlled in the manner hereinafter described. The ingredients are then heated to an alcoholysis temperature under superatmospheric steam pressure. When alcoholysis is complete, the steam pressure is released and the reaction mixture is then allowed to esterify to the desired specifications.

One of the advantages of the present in situ alcoholysis process has been found to be the shorter cycle times involved. The second addition of ingredients (required by the prior art) is eliminated and esterification times have been observed to be shorter. Products produced by the inventive process have very consistent qualities (more so than the prior art products). This is undoubtedly due, in part at least, to the production of a more consistent alcoholysis product. Smaller losses of material have been noted during processing. Molecular weight distribution of the desired products is more even. The end products have generaly lower viscosities which allow for easier handling. By its very nature, the process is adapted to a simplified test for determining when alcoholysis is complete. In the case of short oil alkyds (i.e., alkyds containing a minor amount of oil), normal alcoholysis techniques involve such a small volume of material that heat transfer is very poor. The in situ alcoholysis process offers an obvious additional advantage in this situation.

The present inventors have observed that, under ordinary circumstances, when all of the ingredients required to prepare a conventional oil-modified alkyd resin are reacted simultaneously (e.g., an oil such as soybean oil, a dibasic acid such as phthalic anhydride, and a polyol such as pentaerythritol), a polyester will form from the dibasic acid and the polyol. This direct esterification reaction consumes a sufficient number of the hydroxyl groups of the polyol and prevents successful alcoholysis between the oil and the polyol. Thus, an oil-modified alkyd resin is not obtained as the dominant product. Instead, a useless combination of oil and oil-free polyester is produced.

The present inventors have discovered that if this same mixture of ingredients is allowed to react under elevated steam pressure, the direct esterification reaction is inhibited. Consequently, this allows more unreacted hydroxyl groups to remain in the mixture, thereby allowing alcoholysis to take place. It has been determined by then that by controlling the steam pressure, it is possible to keep a sufficient amount of free hydroxyl groups available indefinitely to thereby promote the alcoholysis reaction between the polyol and the oil. It has been further noted by them that the presence of water (either in the liquid or gas phase) does not adversely affect the desired alcoholysis reaction. After alcoholysis is complete, the steam pressure is reduced, and esterification follows, thereby producing the desired oil-modified alkyd resin.

In developing the present in situ alcoholysis process, a method has been devised by the present inventors to determine the conditions needed for in situ alcoholysis to take place. They have discovered that there is a minimum ratio (at esterification equilibrium) of equivalents of free hydroxyl groups to equivalents of fatty acid groups in the oil which must exist for in situ alcoholysis to take place. This ratio has been defined by them as the "remaining ratio." It has been found by the present inventors that the minimum effective remaining ratio at which alcoholysis will take place is about 1.07.

The remaining ratio for a given system can be found by reference to the following equations:

$$X = \frac{(AV)(W)}{56,100} \quad (1)$$

$$R = \frac{X+P-C}{Z} \quad (2)$$

wherein the terms are defined as follows:

AV=Acid value of reactants at esterification equilibrium
W=Weight of reactants at esterification equilibrium
X=Equivalents of unreacted acid at esterification equilibrium
P=Equivalents of hydroxyl groups in the initial charge, excluding those in the oil
C=Equivalents of acid groups in the initial charge, excluding those in the oil
Z=Equivalents of fatty acid in the oil
R=Remaining ratio By esterification equilibrium, it is meant to refer to the equilibrium which exists under the in situ alcoholysis conditions, which conditions are employed to suppress esterification and promote alcoholysis. Obviously, such a parameter has no meaning in the prior art two-step process where oil and polyol are the only reactants present during alcoholysis.

Some water is produced during the in situ alcoholysis by direct esterification. This water formation inherently helps to increase the remaining ratio. Water can also be included in the initial charge to help raise the ramaining ratio. However, much of this water will usually be removed as steam which, in turn, will advantageously suppress esterification during the in situ alcoholysis. In any event, the effect of water (in the liquid phase) on the remaining ratio is normally small and a large change in water content is usually needed to see any pronounced effect. The overall effect of including more water in the initial charge of ingredients is to raise the equilibrium acid value, to raise the remaining ratio, and to raise the pressure (using a closed system and internally generated pressures).

Higher pressures also increase the remaining ratio. The effect is significant. With some resin formulations, no adjustment in the ingredients is needed to conduct in situ alcoholysis, provided the pressure is sufficiently high to keep the remaining ratio above 1.07, e.g., at 1.15. However, for many resin formulations, the required pressure is intolerably high and far exceeds the pressure limits of conventional reaction vessels.

A higher alcoholysis temperature can usually be tolerated using the present in situ process, because etherification is curbed by the presence of water. However, as the temperature is raised so is the pressure (if internally generated pressures are used) and it can easily be seen that an intolerable pressure might be realized for the particular reactor available. Additionally, while higher temperatures speed up the reaction, they usually decrease the remaining ratio. Ordinarily, the effect is quite small, but sometimes it can be significant. Alcoholysis temperatures for the in situ process will generally approximate the conventional prior art alcoholysis temperatures. Temperatures of from 300° to 600° F. can be used, although temperatures of from 400° to 550° F., e.g., 420° to 490° F. are preferred.

The remaining ratio can also be increased (most conveniently) by adjusting the initial charge of ingredients so that a portion of, for example, the glyceride oil is replaced by fatty acid and glycerine. This has the effect of significantly increasing the remaining ratio without appreciably changing the equilibrium acid value. If this is done, a lower pressure can be used than would otherwise be needed. If all of the oil is replaced by fatty acid and glycerine, no pressure (zero p.s.i.g.) is needed since the requirement for an alcoholysis step is eliminated.

The equivalents of fatty acid, as well as glycerine, which are needed to replace an equivalent amount of glyceride oil to maintain a remaining ratio of R at a desired equilibrium acid value of AV is given by Equation 3.

$$B = \frac{F-X+P-C}{R} \quad (3)$$

wherein the terms are defined as follows:

X, P, C and R are as previously defined
B = Equivalents of fatty acid which is necessary to replace an equivalent amount of fatty acid in the oil
F = Equivalents of fatty acid in the oil before any of it is replaced by fatty acids All unknowns appearing in Equations 1-3 can be determined from the initial unreacted charge of ingredients to the reaction zone, with the exception of the equilibrium acid value, AV. Those skilled in the alkyd resin art will probably have information available to them on the equilibrium acid value. If not, they can easily determine it by performing the reaction on a small scale. However, in the absence of such data, an estimated acid value of 90 (at 100 p.s.i.g. and 450° F.) can be used to make a crude approximation of the appropriate parameters when using glyceride oils. Once experience has been gained, the proper equilibrium acid value can be inserted in the equations and the relative amounts of the ingredients further modified to fit the newly determined requirements to ensure a smooth, yet economical operation.

The in situ alcoholysis is conducted in the liquid phase under steam pressure. Pressures of up to 500 p.s.i.g. can be used, although it will generally be found more convenient to operate with pressures of from 50 to 200 p.s.i.g. Pressures below 120 p.s.i.g., e.g., about 100 p.s.i.g., are especially preferred since many reaction vessels currently used by industry are so limited. The steam pressure can be obtained by pressurizing the reaction zone with live steam. However, a more convenient and preferred practice is to add water to the initial charge of ingredients, heat the mixture in a closed system (after first evacuating air) and bleed off steam to maintain the desired pressure (e.g., to maintain 100 p.s.i.g.) until the desired alcoholysis temperature is reached. It has been found that holding the reaction for thirty minutes without releasing any steam, and then releasing steam to get the desired temperature, produces no advantages insofar as preventing the loss of volatile materials is concerned.

In the preferred form of the present invention, water is included in the initial charge to provide the steam source. The amount of water present in the charge should be sufficient to vaporize and maintain the desired pressure under the alcoholysis conditions. This vapor (i.e., steam) will suppress direct esterification and allow the in situ alcoholysis to take place. The amount of water used will be an effective amount ranging from more than incidental impurities up to as much as 20 weight percent (based on the combined weight of all the ingredients in the charge, including water). More frequently, this amount will be from 1 to 15 weight percent, e.g., 2 to 10 weight percent on the same basis. Since water present in the liquid phase has no adverse effect on the reaction (usually it gives a slight improvement in the remaining ratio) it is advantageous to include more water than would appear necessary. Then, if desired, the amount of water used in each succeeding run can be slightly decreased until an optimum amount is reached.

Likewise, it is desirable to use a remaining ratio that is higher than the 1.07 minimum. It is preferred to use a remaining ratio above 1.15 to avoid any likelihood of gel formation. Here again, it is then possible to reduce the remaining ratio of each succeeding run by using more oil and less fatty acid and glycerine. Thus, more favorable economics could be obtained without risking gel formation. When a gel forms in a reactor (through an inadequate remaining ratio or insufficient pressure), the product is not only ruined, but there is a considerable amount of work involved in cleaning the reactor.

It must be realized that it is possible for the calculated remaining ratio to differ from the actual remaining ratio (especially where, for example, an estimated AV has been used). Thus, caution should be used in adjusting a conventional resin formulation to in situ processing. Therefore, a higher calculated remaining ratio is suggested for the initial attempt (e.g., use a remaining ratio of 1.20 and 10 weight percent water) so as to avoid the possibility of gel formation.

In determining the completion of alcoholysis, a methanol solubility test can be used. The methanol solubility test is one of the most common tests used to determine when an alcoholysis reaction has been completed. This test can be effectively used for testing reaction completion for "in situ" alcoholysis. The procedure involves testing the solubility of the reactants in methanol (anhydrous). When the reactants are soluble a clear solution is obtained; when insoluble, a cloudy solution is obtained. This test is used because free oil is fairly insoluble in methanol. The acceptable ratio of methanol to reactants varies with the oil length and other constituents of the alkyd. Normally, for short oil alkyds, the solutions should be clear at 4 volumes of methanol to 1 volume of reactants. For a long oil alkyd, a 1 to 1 ratio is not uncommon. Alkyd chemists normally have a feel for what the methanol test should be for a particular alkyd. However, it has been found through experience that in situ alcoholysis is completed at the time when the reaction mixture has a brilliant clarity. No exception to this has been found for alkyd resins based on phthalic anhydride.

When alcoholysis is complete, the steam pressure is released, preferably at a slow rate, e.g., 10 p.s.i. per minute or slower. A preferred rate of release is 5 p.s.i. per minute or less. If the steam pressure is released too rapidly, volatile ingredients can vaporize and be lost. After the pressure has been released, the ingredients are then esterified at temperatures of from 300° to 600° F., more usually form 400° to 550° F., e.g., 420° to 490° F. Esterification is ordinarily continued until the acid value has reached some predetermined level. It is common to continue the esterification until the acid value is reduced below 50. Some resins are prepared by continuing the esterification to an acid value below 30, and some other resins are prepared by continuing the esterification until an acid value of below 10 has been reached, e.g., below 5. The esterification can be accomplished under an inert atmosphere (e.g., nitrogen gas). If desired, by-product water can be removed during the reaction by using a gas sparge or the like.

The resin forming ingredients that can be used in practicing the present invention include all those known in the alkyd art. Broadly speaking, the formulations inevitably include alcohol, acid and oil. Since oil-modified, glyceryl phthalate type resins form a most important subclass of these resins, it can be expected that the formulation will include glycerine (an alcohol), phthalic anhydride (an acid), and an oil such as soybean oil or linseed oil. However, other ingredients can be used.

Typical resin forming ingredients form a wide variety of materials including the fatty glycerides such as linseed oil, soybean oil, tall oil, safflower oil, and the like; alcohols such as glycerine, inositol, pentaerythritol, ethylene glycol, trimethylol propane, fatty alcohols and the like; carboxylic acids and anhydrides such as phthalic anhydrides, maleic anhydride, fatty acids, benzoic acid, isophthalic acid, chlorendic acid, fumaric acid, and the like.

The oils used in making the oil-modified alkyd resins of the present invention are esters of monocarboxylic acids and mono- and polyhydric alcohols. They can be of natural or synthetic origin and mixtures of oils can be used. The monomeric alcohol portion of these oils will usually contain from 1 to 26 carbon atoms, ordinarily in an aliphatic hydrocarbon chain. Where the alcohol portion of the oil is the residue of a monohydric alcohol (e.g., oleyl alcohol), it will usually tend toward the higher carbon contents, e.g., $C_{12}$ to $C_{24}$ monohydric aliphatic alcohols. Sperm oil is a naturally occurring mixture of glycerides and ester of monohydric long chain alcohols. Conversely, where the alcohol portion of the oil is the residue of a polyhydric alcohol (e.g., glycerine), it will usually tend toward the lower carbon contents, e.g., $C_2$ to $C_6$ polyhydric alcohols. For example, soybean oil is a mixture of glycerides of the higher (e.g., $C_{18}$) fatty acids. Oils which are the esters of glycerine are particularly preferred. The acid portion of the oils will usually contain from 1 to 26 carbon atoms, ordinarily in an aliphatic hydrocarbon chain. Oils which are esters of fatty acids, e.g., esters of $C_6$ to $C_{26}$ and preferably $C_{12}$ to $C_{24}$ fatty acids, are particularly preferred.

These oils can be broadly characterized as esters of (1) monohydric and polyhydric, saturated and ethylenically unsaturated, aliphatic and cycloaliphatic alcohols, and (2) monocarboxylic, saturated and unsaturated, aliphatic acids. More preferred are the esters of (1) polyhydric, saturated and ethylenically unsaturated, $C_2$ to $C_6$ aliphatic alcohols, and (2) $C_8$ to $C_{24}$ fatty acids. Especially preferred oils are the fatty triglycerides, e.g., soybean oil, safflower oil, linseed oil and the like, as well as mixtures thereof.

It should be remembered that oil-modified alkyd resins are well known in the alkyd art. Consequently, the initial selection of reactants is a feat well within the skill of the routineer. See Golding, Polymers and Resins, their Chemistry and Chemical Engineering 295 et seq. (1959).

From the foregoing description, it can be appreciated that conventional oil-modified alkyd resin formulations can be adapted to the in situ alcoholysis process by using steam pressure to suppress direct esterification during alcoholysis. When the remaining ratio is below 1.07 (e.g., 0.94), it can be raised to 1.07 or higher by using lower temperatures, by using higher steam pressures, by having water present in the liquid phase during alcoholysis, and by replacing a portion of the oil (e.g., soybean oil) by the corresponding free acid (e.g., fatty acid) and free alcohol (e.g., oleyl alcohol or glycerine). Catalysts can be used during alcoholysis and esterification as desired. Conventional finishing steps can be applied to the products as is common in the art.

The present invention is further illustrated by reference to the following comparative data and the specific examples (which include a preferred embodiment). Unless otherwise indicated, all parts are by weight and all percentages are weight percentages. The raw materials used in the following runs were commercially available materials obtained from the suppliers indicated.

RAW MATERIALS

Soybean oil.—Once refined, acid value, .5 max., iodine value, 126 minimum
Soybean oil fatty acids.—RO–11–S
Pentaerythritol.—Technical grade
Phthalic anhydride.—Commercial grade
Fumaric acid.—Commercial grade
Glycerine.—99.5%
Isophthalic acid.—Amoco 95
Benzoic acid.—Technical grade
Safflower oil.—Nonbreak
Safflower oil fatty acids.—Wecoline SF
Linseed oil.—Bleached and refrigerated
Linseed oil fatty acids.—520 vegetable acids (A) Conventional prior art process The following run shows how an oil-modified alkyd resin is conventionally made. This oil-modified alkyd resin was prepared by conventional liquid phase techniques from a total formulation consisting of 63.66 parts of safflower oil, 13.68 parts of pentaerythritol, 0.03 part of litharge, 25.47 parts of phthalic anhydride, 0.22 part of maleic anhydride, and 0.07 part of triphenyl phosphite. The procedure employed was to first alcoholize a mixture of the safflower oil, pentaerythritol and litharge (a catalyst) at 446° F. under substantially atmospheric pressure to obtain a conventional alcoholysis product. Then the remaining ingredients were added to the alcoholysis product, along with sufficient solvent (xylene) for reflux purposes and the material was esterified under conventional conditions at 446° F. By this conventional technique, an oil-modified alkyd resin product was obtained which met commercial specifications after conventional finishing (i.e., an acid number of 10 max. and a color of 8 max. (Gardner color scale) at a concentration of 69–71% nonvolatile in a mineral spirits solvent).

For a fuller treatment of the now conventional two-step process, see Robinson, U.S. Patent 2,123,206 (incorporated herein by reference).

(B) Simultaneous reaction of prior art ingredients

When all of the ingredients of A above were simultaneously charged to a reaction vessel and heated under substantially atmospheric pressure to what would ordinarily be an alcoholysis temperature, the ensuing reaction did not proceed in the desired direction, but rather resulted in a useless mixture of unwanted materials. The extent of alcoholysis taking place was insignificant.

EXAMPLE 1.—(In situ processing of prior art resin of run "A")

By employing the remaining ratio concept and using water to suppress direct esterification during alcoholysis, it was determined that in situ alcoholysis could be effectively used at 450° F. (similar to comparative run A) and 100 p.s.i.g. steam pressure (a self-imposed maximum) if a portion of the safflower oil was replaced by a corresponding amount of fatty acid and glycerine. In following the in situ technique, 56.24 parts of safflower oil, 7.1 parts of safflower fatty acid, 0.75 part of glycerine, 25.47 parts of phthalic anhydride, 13.68 parts of pentaerythritol, 0.22 part of maleic anhydride, 0.07 part of triphenyl phosphite, 0.05 part of lithium hydroxide monohydrate, and 3.0 parts of water were charged to a reaction vessel. All of the ingredients were then heated to 450° F. while bleeding off sufficient steam to keep the pressure at 100 p.s.i.g. Liquid phase alcoholysis ensued and was continued until a 2:1 methanol solubility was obtained and an equilibrium acid value of 89 was reached. At this acid value, the remaining ratio was 1.06 (this represents about the lowest value of "R" that could be successfully used). The pressure was then slowly released (at a rate below 10 p.s.i. per minute) and sufficient xylene was added for reflux purposes. The mixture was then esterified conventionally at 460° F. under reflux conditions. The resulting oil-modified alkyd resin, after conventional processing, adequately met the specifications currently set for alkyd resins produced by conventional processes (see comparative run A).

EXAMPLE 2

To further illustrate the usefulness of using water to suppress direct esterification and the usefulness of the remaining ratio concept, the in situ alcoholysis concept was applied to the preparation of another oil-modified alkyl resin which had been previously manufactured by the conventional two-step technique from soybeam oil, glycerine, pentaerythritol, phthalic anhydride, and fumaric acid. Using Equations 2 and 3, the remaining ratio for the conventional charge (no oil replaced by free fatty acid or glycerine) was calculated to be 0.96. This remaining ratio was considerably lower than the minimum ratio of about 1.07 that is required for in situ alcoholysis. Therefore, Equation 3 was used to determine how much of the oil needed to be replaced by fatty acid and glycerine to allow the in situ alcoholysis process to be employed. It was determined that the new charge must contain a ratio of free fatty acids to oil equal to 0.107 to give a remaining ratio of 1.25 at 450° F. (a conventional alcoholysis temperature) and 100 p.s.i.g. (a self-imposed limitation). The following procedure was then employed. The original formulation was altered only to the extent of replacing part (i.e., about 10%) of the oil with a corresponding amount of free fatty acid and glycerine and to the extent of including water in the formulation. Thus, about 90% of the fatty acids were still to be supplied by the oil. The remaining ratio was intentionally made higher than needed to make certain that gel formation was avoided.

The new charge (now adjusted to provide a remaining ratio greater than 1.07 at 450° F. and 100 p.s.i.g.) consisted of the following: 57.14 parts of soybean oil, 6.10 parts of soy fatty acid, 2.19 parts of glycerine, 12.79 parts of pentaerythritol, 24.58 parts of phthalic anhydride, 0.71 part of fumaric acid, 0.01 part of lithium hydroxide monohydrate, and 4.16 parts of water. All of these ingredients were charged to a reaction vessel. A vacuum was briefly applied to the reaction vessel to remove air (this improves product color) which was then sealed. The reaction vessel was then heated until the internally generated steam pressure reached 100 p.s.i.g. Heating was continued to 450°–455° F. while releasing steam to maintain the pressure at about 95–100 p.s.i.g. The reaction mixture was sampled every 15 minutes until a sample was obtained that had a brilliant clarity. At this point, it was determined that the in situ alcoholysis was complete. Before proceeding, a sample of the alcoholysis reaction mixture was taken to test the initial equilibrium acid value assumption. The equilibrium acid value was determined to be 94. Steam pressure was then slowly reduced to substantially atmospheric pressure. Then a solvent (xylol) was added and the reaction mixture was allowed to esterify under reflux conditions at 480° F. After esterification was complete, the resulting oil-modified alkyd resin was finished in a conventional manner and easily met the specifications for the same product prepared by the conventional two-step process.

The simple test used to determine the completion of alcoholysis is one advantage of the present in situ process. When the reaction has progressed sufficiently, a clear sample will ordinarily be obtained indicating such. Otherwise, a cloudy sample is obtained. In some isolated cases, the polybasic acid may be insoluble, thereby causing a precipitate. However, this precipitate can be centrifuged and, if the liquid is clear, the reaction is complete.

EXAMPLE 3

This example shows the effect of increasing the alcoholysis temperature in an effort to obtain faster reaction times. At 520° F. and 100 p.s.i.g. the equilibrium acid value for the resin forming mixture described in Example 2 was known from prior experience to be 67. Using this acid value in Equations 1 and 2, it was determined that the ratio of free fatty acid to oil had to be about 0.47 to keep the remaining ratio above 1.07 (actually about 1.17). Thus, the use of a significantly higher alcoholysis temperature adversely affects the remaining ratio and requires significantly more free fatty acid than is required when lower temperatures are used. Based on these calculations, a portion of the oil was replaced with fatty acid and glycerine and the procedure described in Example 2 was followed exactly, with the sole additional exception that the temperature employed during alcoholysis was 520° F. The oil-modified alkyd resin produced by this in situ alcoholysis technique was found to be equivalent to the oil-modified alkyd resin commercially produced from the same ingredients by the conventional two-step procedure. The advantage of the higher temperature employed in this example is in the faster reaction time. The disadvantage is that more fatty acids are needed. It is emphasized that etherification is curbed to a great extent by the steam employed during alcoholysis. It is further pointed out that the requirement for additional fatty acid is predicated to a large extent on a desire to keep the steam pressure at a moderate level. Because many conventional reactors now in commercial use can only be operated safely at pressures which are not substantially above 100 p.s.i.g., a sufficient amount of the oil was changed to fatty acid and glycerine so that a pressure of 100 p.s.i.g. could be employed. Where pressure is not a limiting factor, it will be possible to determine equilibrium acid values at various temperatures and pressures and to accommodate the system accordingly. Thus, at any given temperature and pressure, an equilibrium acid value can be determined and then the ingredients may be adjusted to meet or preferably exceed the required minimum remaining ratio of about 1.07. While higher remaining ratios can be used, there is no significant advantage to doing so except as a precautionary measure. Even there, as experience is gained, the remaining ratio can be lowered toward 1.07.

EXAMPLE 4

Again using the remaining ratio concept, a portion of the oil in another conventional oil-modified alkyd resin formulation was replaced with free acid and free alcohol to give a remaining ratio of 1.17. Here, 38.25 parts of soy fatty acids, 360 parts of soybean oil, 13.75 parts of glycerine, 80.65 parts of pentaerythritol, 4.48 parts of fumaric acid, 155 parts of phthalic anhydride, 0.026 part of lithium hydroxide monohydrate, and 16 parts of water were charged to a reaction vessel. The procedure described in Example 2 was followed using a steam pressure of 100 p.s.i.g. and an alcoholysis temperature of 430° F. Four hours and five minutes after the heating began, the alcoholysis product was clear and had an equilibrium acid value of 93–95. There was no sign of any gel, and the product had a color (Gardner) of from 5–6. Methanol solubility was 2:1. At this point, sufficient xylene was added for reflux purposes and the alcoholysis product was esterfied at 480° F. under reflux conditions. In about two hours and thirty minutes, esterification was complete. The resulting oil-modified alkyd resin, after conventional finishing, had an acid value of 6 and a viscosity at M–70 of 50.6 stokes. The final color was 6–7.

EXAMPLE 5

Again, the concepts were applied to still another resin formulation which was adjusted to give a remaining ratio above 1.07. Here, 39 parts of city water, 536 parts of soybean oil, 57.3 parts of fatty acids, 20.5 parts of glycerine, 120 parts of pentaerythritol, 230.5 parts of phthalic anhydride, 6.25 parts of fumaric acid, 0.094 part of lithium hydroxide monohydrate, and 1.0 parts of triphenyl phosphite were charged to a reaction vessel. A vacuum was pulled on the vessel to remove air and the ingredients were heated to 150° F. The reaction vessel was then sealed and heated to 480° F. Pressure was kept from going over 100 p.s.i.g. by bleeding off steam as necessary. Alcoholysis ensued and was allowed to continue until samples of the alcoholysis product were clear. The steam pressure was slowly released and sufficient xylol was added for reflux purposes during esterification. The reaction mixture was then allowed to esterify under reflux conditions at 485°–490° F. until the desired specifications were met. After conventional finishing, the oil-modified alkyd resin met commercial specifications (i.e., an acid value of from 5–10 and a viscosity of C–D at M–50).

The present invention is still further illustrated by reference to the data contained in Table I. These data were obtained by processing a current resin formulation (both with and without adjusting the oil/fatty acid ratio).

TABLE I.—IN SITU PROCESSING OF AN OIL-MODIFIED ALKYD

| Run No | 1[1] | 2[1] | 3[1] | 4[1] | 5[1] | 6[2] | 7[1] | 8[1] | 9[1] | 10[1] | 11[1] |
|---|---|---|---|---|---|---|---|---|---|---|---|
| Remaining ratio | .90 | 0.98 | 1.06 | 1.10 | 1.12 | 1.13 | 1.24 | 1.22 | 1.26 | 1.26 | 1.50 |
| Percent of total fatty acid supplied by the oil | 85 | 85 | 85 | 90 | 90 | 90 | 90 | 90 | 90 | 100 | 100 |
| Pressure (p.s.i.g.) | 60 | 80 | 80 | 94 | 100 | 100 | 100 | 100 | 100 | 180 | 300 |
| Temperature (° F.) | 490 | 490 | 490 | 450 | 450 | 450 | 420 | 450 | 420 | 455 | 455 |
| H₂O included in charge (percent) | 10 | 10 | 10 | 10 | 2.5 | 2.5 | 2.5 | 10 | 10 | 10 | 10 |
| Equilibrium acid value | 47.7 | 60 | 62.3 | 78.7 | 80.5 | 82 | 93 | 91 | 95 | 110 | 138 |
| Charge formulation: | | | | | | | | | | | |
| Soybean oil | 320 | 320 | 320 | 360 | 360 | 360 | 360 | 360 | 360 | 400 | 400 |
| Soybean oil fatty acid | 77 | 77 | 77 | 38 | 38 | 38 | 38 | 38 | 38 | 0 | 0 |
| Glycerine | 18 | 18 | 18 | 14 | 14 | 14 | 14 | 14 | 14 | 31 | 31 |
| Pentaerythritol | 81 | 81 | 81 | 81 | 81 | 81 | 81 | 81 | 81 | 81 | 81 |
| Phthalic anhydride | 155 | 155 | 155 | 155 | 155 | 155 | 155 | 155 | 155 | 155 | 155 |
| Fumaric acid | 5 | 5 | 5 | 5 | 5 | 5 | 5 | 5 | 5 | 5 | 5 |
| Water | 65 | 65 | 65 | 65 | 16 | 16 | 16 | 65 | 65 | 65 | 65 |
| Catalyst | .17 | .17 | .34 | .17 | .17 | .17 | .17 | .17 | .17 | | |

[1] Vacuum at start up to remove all air from reactor.
[2] Nitrogen sparge at start up before sealing at one atmosphere nitrogen pressure.

Runs 1–4 illustrate how the minimum effective remaining ratio is between 1.0 and 1.10. Runs 1 and 2, both having a remaining ratio below 1.0, produced completely gelled (solid) masses. Runs 3 and 4 (at $R=1.06$ and $R=1.10$) produced usable resins which contained a few gel particles indicating a critical or sensitive region. Runs 5 and 6 (R above 1.10) both produced very good resins, indicating that the process was above the sensitive area of 1.0 to 1.10. These and other runs have indicated the minimum effective remaining ratio to be about 1.07. Because R can vary due to errors in calculation and/or errors in charging, etc., the use of a remaining ratio above 1.10, e.g., above 1.15, is favored, although economics may dictate the use of the lowest possible value of R, e.g., about 1.07.

The effect of temperature can be seen by comparing run 5 with run 7 and run 8 with run 9. Lowering the temperature raises the equilibrium acid value and raises the remaining ratio. Conversely, higher temperatures lower the acid value and lower the remaining ratio. The temperature effect is usually small, but it can sometimes be quite significant.

Runs 10 and 11 show how it is possible to raise the pressure high enough to successfully practice the in situ technique without replacing any of oil with fatty acid and glycerine. However, as previously pointed out, many available reaction vessels cannot be safely operated at high pressures. Consequently, it becomes necessary to replace part of the oil so as to be able to use lower pressures.

The data in Table II further illustrate the use of the present in situ alcoholysis technique.

Referring now to Table II, runs 12, 13 and 14 are examples of resin formulations that inherently were capable of giving a remaining ratio above 1.07 at the in situ alcoholysis conditions without modification. Additionally, these formulations also provided sufficient by-product water by esterifying during the in situ alcoholysis to enable a steam pressure of 100 p.s.i.g. to be generated and maintained in a closed system (steam was bled off as necessary to keep the pressure at 100 p.s.i.g.). These resins are considered to be short oil alkyds. A high remaining ratio is more easily obtained from a short oil alkyd than from a long oil alkyd (e.g., the alkyds of Table I). At 100 p.s.i.g., the long oil alkyds need added water and fatty acid substitution to obtain a sufficiently high remaining ratio. Runs 15–17 further illustrate the application of in situ processing to the preparation of oil-modified alkyds.

From the foregoing description and examples, it can be appreciated that conventional alkyd resin formulations can be adapted to the present in situ alcoholysis technique by employing the remaining ratio concept in conjunction with the use of steam pressure. The process involves inhibiting the reaction of the polybasic acid with the polyhydric alcohol to the extent that enough hydroxyl groups are available to transesterify with the oil. This is done by keeping the remaining ratio above a certain value (i.e., above 1.07, preferably from 1.10 to 2, e.g., 1.15 to 1.6) and by using steam pressure. The remaining ratio can be adjusted by pressure, temperature, addition of water, and by replacing some of the oil by equivalent portions of fatty acid and glycerine.

The present invention provides a sophisticated batch process for preparing oil-modified alkyd resins from conventional ingredients in less time, with fewer manipulative steps, than has heretofore been thought practical. As was previously mentioned, a narrower, more even, molecular weight distribution of the resulting oil-modified alkyd resin is obtained when the in situ alcoholysis process is employed. Usually, an even molecular weight distribution makes a more compatible resin and a faster drying resin. Thus, the advantages to be obtained from in situ alcoholysis are many, i.e., simplified operations, consistent product quality, smaller losses of materials during processing, less operator time, etc.

Having described the present invention with a certain degree of particularity, it will be realized that numerous changes and variations, falling within the spirit and scope of this invention, will become obvious to those skilled in the art. It is not intended that this invention be limited

TABLE II.—IN SITU PROCESSING OF OIL-MODIFIED ALKYDS

| Run No | 12[1] | 13[1] | 14[1] | 15[1] | 16[1] | 17[1] |
|---|---|---|---|---|---|---|
| Remaining ratio | 1.30 | 1.32 | 1.50 | 1.15 | 1.49 | 2.25 |
| Percent of fatty acid supplied by the oil | 100 | 100 | 100 | 88 | 68 | 100 |
| Pressure (p.s.i.g.) | 100 | 100 | 100 | 100 | 100 | 100 |
| Temperature (° F.) | 450 | 450 | 450 | 520 | 520 | 450 |
| H₂O included in charge (percent) | 0 | 0 | 0 | 5 | 5 | 5 |
| Equilibrium acid value | 102 | 78 | 95 | 73 | 73 | 113 |
| Charge Formulation: | | | | | | |
| Soybean oil | 294 | 520 | 559 | | | 345 |
| Soybean fatty acid | | | 0 | | | 0 |
| Linseed oil | | | | 575 | 443 | |
| Linseed oil fatty acid | | | | 73 | 196 | |
| Glycerine | 110 | | 164 | 108 | 122 | 22 |
| Pentaerythritol | | 120 | | 30 | 30 | 202 |
| Phthalic anhydride | | 337 | 305 | 232 | 232 | 335 |
| Fumaric acid | | | 13 | | | |
| Maleic anhydride | | | | 20 | 20 | |
| Water | | | 0 | 50 | 50 | 50 |
| Isophthalic acid | 264 | | | | | |
| Benzoic acid | 43 | | | | | 161 |
| Ethylene glycol | | 65 | | | | |

[1] Vacuum at start up to remove all air from reactor.

What is claimed is:

1. The batch process of preparing an oil-modified alkyd resin from a mixture of resin forming ingredients comprising soybean oil, glycerine, pentaerythritol, phthalic anhydride and fumaric acid which comprises:
   (a) replacing part of the soybean oil with an equivalent amount of fatty acid and glycerine to thereby obtain an adjusted mixture having a remaining ratio of at least 1.07, said remaining ratio being the equivalents of free hydroxyl groups to equivalents of fatty acid groups in the oil at esterification equilibrium at a temperature of about 450° F. and a steam pressure of about 100 p.s.i.g.,
   (b) charging all of the ingredients in said adjusted mixture to a reaction zone,
   (c) reacting said mixture in the liquid phase at about 450° F. under a steam pressure of about 100 p.s.i.g., thereby producing an alcoholysis product,
   (d) slowly releasing said steam pressure, and
   (e) esterifying said alcoholysis product to thereby produce an oil-modified alkyd resin.

2. The batch process of claim 1 wherein steam pressure is obtained by including water as an ingredient in said adjusted charge.

3. A process for preparing an oil-modified alkyd resin which comprises forming a mixture of alkyd resin forming ingredients comprising a fatty oil, an acid and an alcohol, in a reaction zone, said mixture having a remaining ratio of at least about 1.07, said remaining ratio being the equivalents of free hydroxyl groups to equivalents of fatty acid groups in the oil at esterification equilibrium, at a selected alcoholysis temperature within the range of 300° to 600° F. and a selected superatmospheric steam pressure not in excess of 500 p.s.i.g.; reacting said mixture at said selected alcoholysis temperature and said superatmospheric steam pressure to thereby produce an alcoholysis product, releasing said steam pressure and esterifying said alcoholysis product, thereby producing an oil-modified alkyd resin.

4. The process of claim 3 wherein the remaining ratio is at least about 1.15.

5. The process of claim 3 wherein the alcoholysis temperature is from 420° F. to 490° F.

6. The process of claim 3 wherein the pressure is from 50 to 200 p.s.i.g.

7. The process of claim 3 wherein the steam pressure is released at a rate at least as slow as 10 p.s.i. per minute.

8. The process of claim 3 wherein steam pressure is obtained by including from 2 to 10 weight percent of water in said mixture of resin forming ingredients.

9. The process of claim 3 wherein air is evacuated from said reaction zone prior to producing the alcoholysis product.

10. A liquid phase batch process for preparing an oil-modified alkyd resin from a mixture of resin forming ingredients comprising a fatty glyceride, an acid, and an alcohol which comprises:
   (a) adjusting the mixture as necessary, by replacing a portion of said fatty glyceride with fatty acid and glycerine to obtain a remaining ratio of at least 1.10, said remaining ratio being the equivalents of free hydroxyl groups to equivalents of fatty acid groups in the oil at esterification equilibrium, at a selected alcoholysis temperature within the range of 420° to 490° F. and selected superatmospheric steam pressure within the range of 100 to 200 p.s.i.g.,
   (b) reacting said mixture, as adjusted, at said selected temperature and pressure to thereby form an alcoholysis product,
   (c) releasing said steam pressure to substantially atmospheric, and
   (d) esterifying said alcoholysis product to thereby produce an oil-modified alkyd resin.

11. The process of claim 10 wherein steam pressure is obtained by including from 2 to 10 weight percent of water in said mixture of resin forming ingredients.

12. In a liquid phase process for preparing an oil-modified alkyd resin from a mixture of resin forming ingredients comprising a fatty oil, polyol and acid wherein said oil and polyol are first reacted under alcoholysis conditions to form an alcoholysis product and wherein said acid and said alcoholysis product are then combined and esterified to produce said alkyd resin, the improvement which comprises: reacting said mixture at a selected alcoholysis temperature within the range of 300° to 600° F. and at a selected superatmospheric steam pressure not in excess of 500 p.s.i.g. to produce an alcoholysis product, said mixture including all of the resin forming ingredients and being adjusted, as necessary, to obtain a remaining ratio of at least about 1.07, said remaining ratio being the equivalents of free hydroxyl groups to equivalents of fatty acid groups in the oil at esterification equilibrium, at said selected temperature and said selected pressure; thereafter releasing said pressure and esterifying said alcoholysis product to produce said oil-modified alkyd resin.

13. The improved process of claim 12 wherein steam pressure is obtained by including water in said mixture.

References Cited

UNITED STATES PATENTS

| | | | |
|---|---|---|---|
| 1,979,260 | 11/1934 | Gauerke | 260—22 |
| 2,123,206 | 7/1938 | Robinson | 260—22 |
| 2,181,893 | 12/1939 | Hopkins et al. | 260—22 |
| 2,369,683 | 2/1945 | Moore | 260—22 |
| 2,870,102 | 1/1959 | Van Strien | 260—22 |
| 3,162,616 | 12/1964 | Dombrow et al. | 260—22 |
| 3,185,668 | 5/1965 | Meyer et al. | 260—75 |
| 3,226,348 | 12/1965 | Purcell et al. | 260—22 |

DONALD E. CZAJA, *Primary Examiner.*

R. W. GRIFFIN, *Assistant Examiner.*

U.S. Cl. X.R.

260—29.6, 33.6, 95; 117—167